United States Patent [19]

Johnson

[11] Patent Number: 4,887,635

[45] Date of Patent: Dec. 19, 1989

[54] FLUID FILL VALVE WITH ACCURATE FILL LEVEL MECHANISM

[75] Inventor: Dwight N. Johnson, Carlsbad, Calif.

[73] Assignee: Masco Corporation of Indiana, Taylor, Mich.

[21] Appl. No.: 332,071

[22] Filed: Apr. 3, 1989

[51] Int. Cl.[4] .................... F16K 21/20; F16K 31/34
[52] U.S. Cl. .................... 137/393; 137/403; 137/426
[58] Field of Search .......... 137/218, 403, 393, 413, 137/414, 426, 436, 437, 454

[56] References Cited

U.S. PATENT DOCUMENTS

| | | | |
|---|---|---|---|
| 1,921,105 | 8/1933 | Spear | 137/454 |
| 2,442,927 | 6/1948 | Horvath | 137/403 |
| 2,646,817 | 7/1953 | Cox et al. | 137/393 |
| 2,685,301 | 8/1954 | Drier | 137/403 |
| 2,806,483 | 9/1957 | MacCauley et al. | 137/403 |
| 3,058,485 | 10/1962 | McQueen | 137/403 |
| 3,144,874 | 8/1964 | Goldtrap | 137/414 |
| 3,144,875 | 8/1964 | Goldtrap | 137/414 |
| 3,584,644 | 6/1971 | Morken | 137/426 |
| 3,895,645 | 7/1975 | Johnson | 137/414 |
| 4,094,327 | 6/1978 | Brandelli | 137/414 |
| 4,180,096 | 12/1979 | Johnson | 137/414 |
| 4,522,227 | 6/1985 | Mylander | 137/393 |
| 4,566,484 | 1/1986 | Silverman | 137/403 |
| 4,574,826 | 3/1986 | Johnson | 137/403 |
| 4,600,031 | 7/1986 | Nestich | 137/426 |
| 4,646,779 | 3/1987 | Johnson | 137/426 |
| 4,705,936 | 11/1987 | Fowler | 219/295 |

Primary Examiner—George L. Walton
Attorney, Agent, or Firm—Steven L. Permut; Malcolm L. Sutherland

[57] ABSTRACT

A fill valve (22) for a toilet tank (10) has a probe (44). A cup member (46) is attached to the end of the probe. The cup member (46) has an inner tubular member (72) forming a chamber extension (42b) in communication with upper control chamber section (42a) in probe (44). A check valve (90) is mounted at the bottom end (60) of cup member (46). The cup member (46) provides for adjustability of fill level (41) of the tank by adaptably sliding up or down along the probe (44).

17 Claims, 3 Drawing Sheets

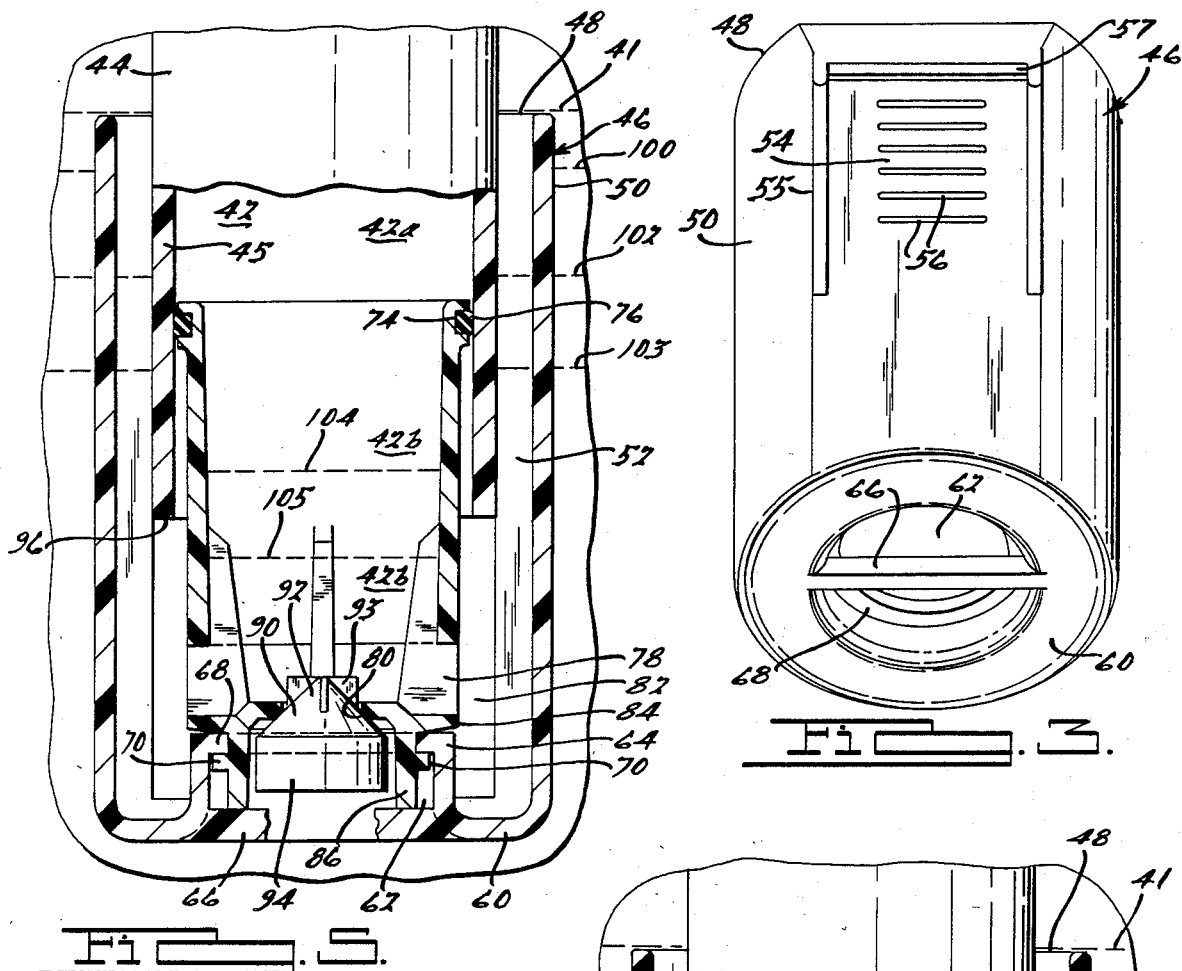
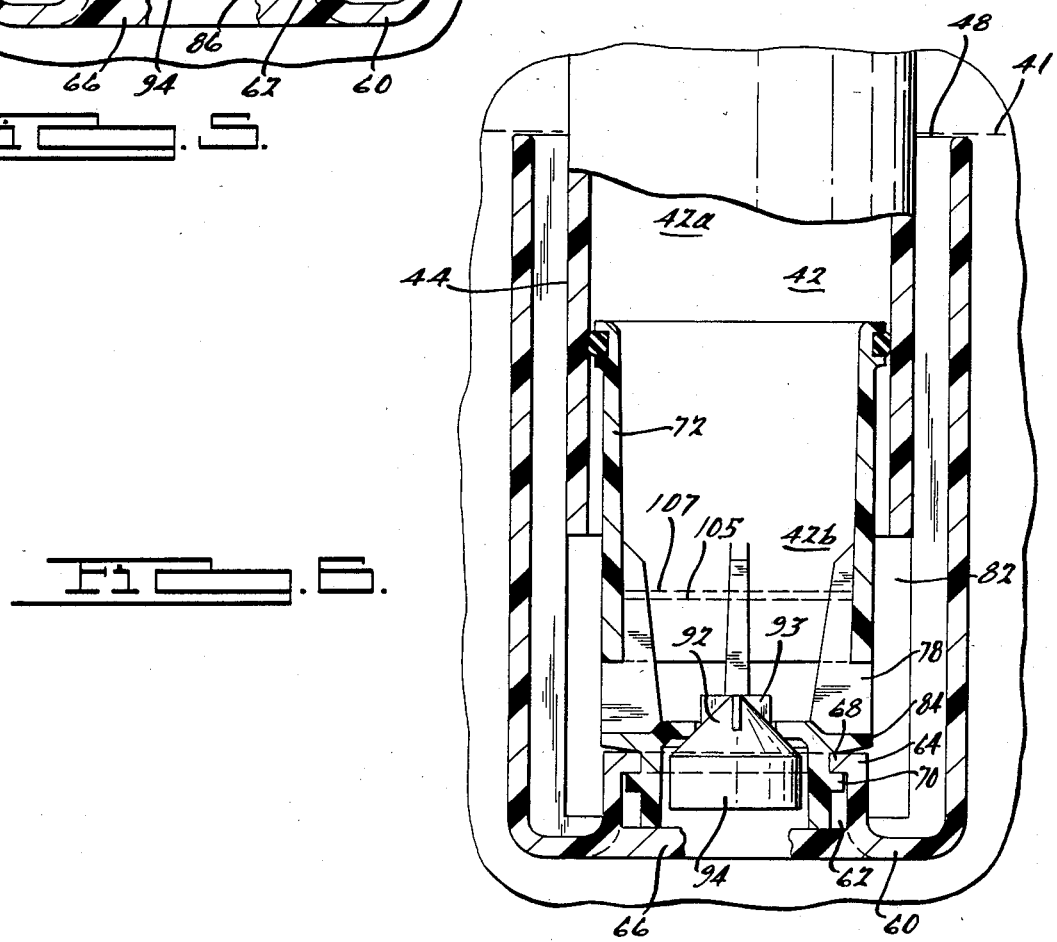

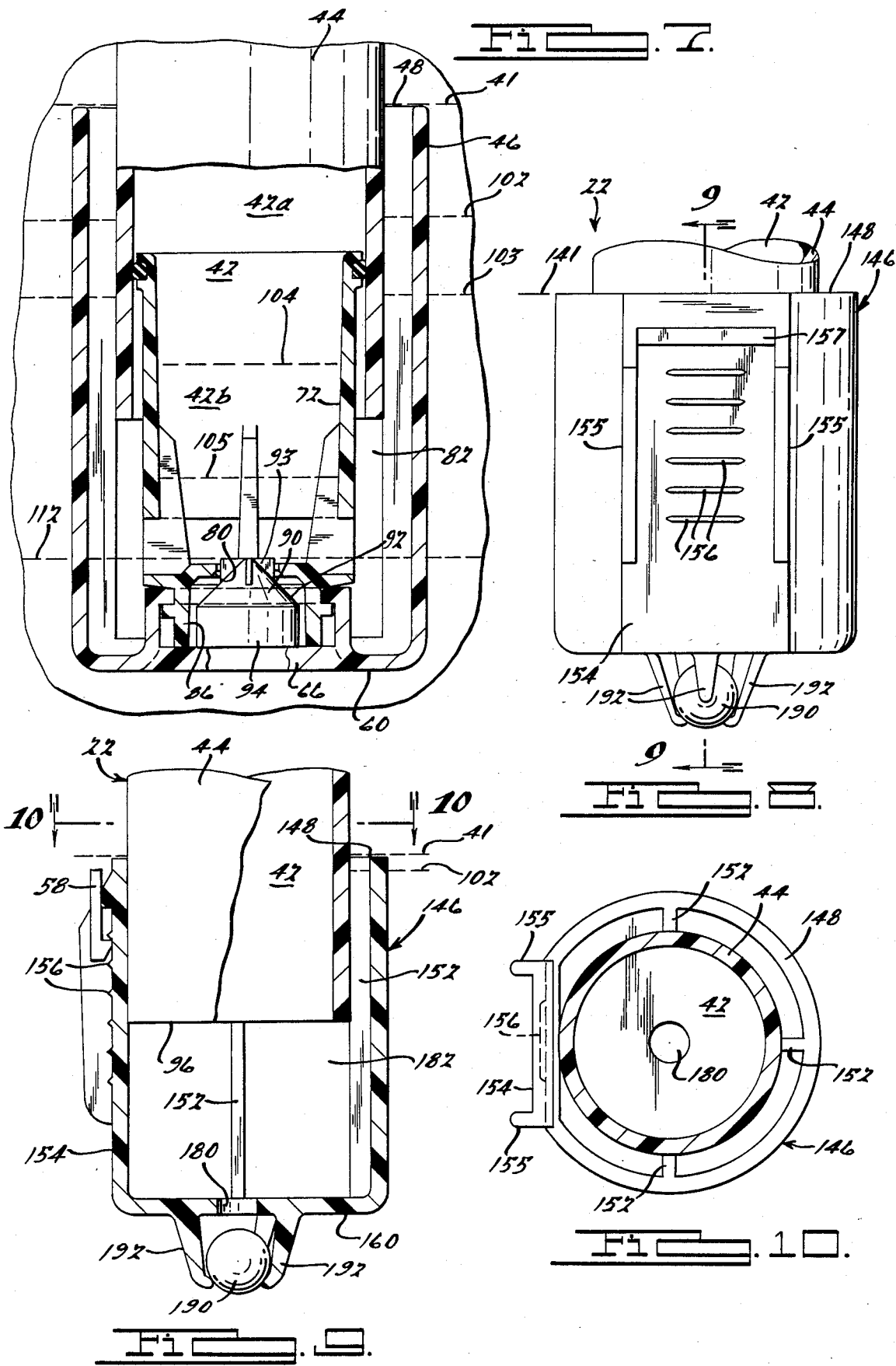

ature patent 4,887,635

FLUID FILL VALVE WITH ACCURATE FILL LEVEL MECHANISM

TECHNICAL FIELD

This invention relates generally to fluid fill valves for water closet tanks.

BACKGROUND OF THE INVENTION

Fill valves function to refill a tank or reservoir to a predetermined liquid level and then automatically shut off. Fill valves are used widely in toilet tanks. Many improvements in fill valves have eliminated the need for a ball cock used as a float that shuts off the valve when the water within the tank reaches the fill level. U.S. Pat. Nos. 3,895,645 issued July 22, 1975 and 4,180,096 issued Dec. 25, 1979 disclose fill valves that are compact and mounted at the bottom of the tank and are entirely submerged when the tank is filled. U.S. Pat. Nos. 4,574,826 and 4,646,779 issued on Mar. 11, 1986 and Mar. 3, 1987, respectively, disclose a fill valve which has the main valve mechanism mounted to be above the overflow level of the tank.

All four patents disclose diaphragm actuated fill valves in which the diaphragm is responsive to pressure in order to turn the main valve on and off. The 4,574,826 and 4,646,779 patents disclose a diaphragm which responds to air pressure within a control chamber. The main valve is positioned above the overflow level of the tank and is mounted on top of a stem section of the valve housing. As the water in the tank rises to an actuation pressure level outside the control chamber, the air is compressed by water rising in a downwardly facing open end of the control chamber, filling the control chamber to a response level that sufficiently compresses the air therein. All the teachings in the above mentioned patents are incorporated in this application by reference.

Commonly, toilet tanks use about two and a half gallons of water per flush. After the fill valve is properly adjusted to its correct height, the exact amount of water within the tank is not crucial for an adequate flush and any deviation due to differences in ambient air pressure or actual changes over time in the diaphragm or due to manufacturing tolerances of other fill valve parts will not significantly affect the flush. However, newer more water conserving toilet tanks offering over 40% reduction of water have been made that use approximately one and a half gallons of water. These low water consumption toilets are more sensitive to deviation in water levels. Differences as low as one cup of water can make a critical difference in obtaining an acceptable flush. As such it is more important to have a precise amount of water in the tank. It is important to accurately fill the tank after each flush and eliminate any deviations of water height due to ambient air pressure, other manufacturing tolerances of the diaphragm or other fill valve parts, or changes occurring over time to the toilet fill valve parts.

Furthermore, most toilet tank designs have a low profile wherein the water level drops only approximately an inch and a half from the fill level to the empty level. It is important that any actuation shut off device needs to be operable and recyclable with no more than the one and a half inch water drop available in most tank designs found in present low water consumption toilets.

SUMMARY OF THE INVENTION

In accordance with one aspect of the invention, a fill valve for a tank includes a housing that contains a main valve operably connectable to a fluid inlet conduit. The main valve opens and closes with respect to the inlet to either allow water to enter the toilet tank or shut off the water from entering the toilet tank. Commonly, the main valve sits on top of a vertically extending stem section that is dimensioned to assure that the valve is above the overflow level of the tank. A control for the main valve responds to a level of liquid (response level) in the control chamber in the housing.

Preferably the response level of liquid in the control chamber forces an increase of air pressure therein which activates a control diaphragm that opens or closes the main valve. The control chamber is in open communication with the tank via an inlet that is positioned above the actuating pressure level outside the control chamber such that when the liquid level in the tank rises to the inlet, liquid flows into the inlet and passes to the control chamber and rises in the control chamber to the response level such that the control shuts off the main valve. A drain valve allows drainage of liquid from the control chamber when liquid in the control chamber is above the liquid level in the tank such that liquid flows out of the control chamber to allow the fill valve to recycle.

Preferably there is an adjustment mechanism that adjusts the vertical position of the inlet within the tank. A device adjusts the response level of the liquid within said control chamber and consequently the actuation pressure level outside the control chamber is adjusted downwardly to remain below the inlet when the inlet is adjusted downwardly.

Desirably, the inlet member is a cup member having an upper open end sized to receive the control chamber section of the fill valve with a clearance therebetween to form the inlet. The cup extends to a point below the lower end of the control chamber and is in communication therewith. The cup preferably is adjustably slidable in a vertical direction with respect to the control chamber. Preferably, a detent mechanism such as vertically spaced horizontal ribs are along the outer surface of the cup and engage a pawl or other securement device to secure the cup in a selected vertical position. The cup has an aperture at the bottom therethrough with a check valve operably mounted within the aperture to allow water to drain from the cup but prevents water from the tank entering into the cup via the check valve.

The inlet cup member is connectable to an inner tube which has its upper end sealingly and slidably mounted to the peripheral wall of the control chamber to form an extension section of the control chamber. The bottom of the control chamber extension is in fluid communication with the rest of the cup member via an opening through the inner tube. The check valve element is interposed between the inner tube and the cup member.

Another aspect of the invention relates to an inlet member which has an open lower interior communicable to a control chamber of a fluid fill valve and an open upper end in fluid communication with the tank interior. A drain means at the bottom of the inlet member lets liquid drain therefrom when liquid in the tank is at a lower level than in the control chamber but prevents water from entering into the inlet member therethrough. The inlet member is constructed to be secured to the fill valve housing. Preferably the inlet member has a generally cup like configuration and is mountable about the control chamber of the fill valve to form a generally annular clearance therebetween. In one embodiment, an inner tubular member is secured at the lower end of the inlet member and is slidably and sealingly connectable to the peripheral wall of the chamber to allow upward and downward adjustment of the inlet member.

BRIEF DESCRIPTION OF THE DRAWINGS

Reference now will be made to the accompanying drawings in which:

FIG. 3 is a bottom perspective view of the cup member shown in FIG. 2;

FIG. 5 is a side elevational segmented view of the cup member and control chamber with water being filled in the tank;

FIG. 6 is a view similar to FIG. 5 showing the water in the tank at the fill level and water in the control chamber above the response level to shut off the main valve;

FIG. 7 is a view similar to FIG. 5 showing water being drained from the control chamber to the tank;

FIG. 8 is a side elevational view of a second embodiment of the invention;

FIG. 9 is a cross sectional view taken along the line 9—9 in FIG. 8; and

FIG. 10 is a cross sectional view taken along the line 10—10 in FIG. 9.

DETAILED DESCRIPTION OF THE PREFERRED EMBODIMENT

Figure 1:
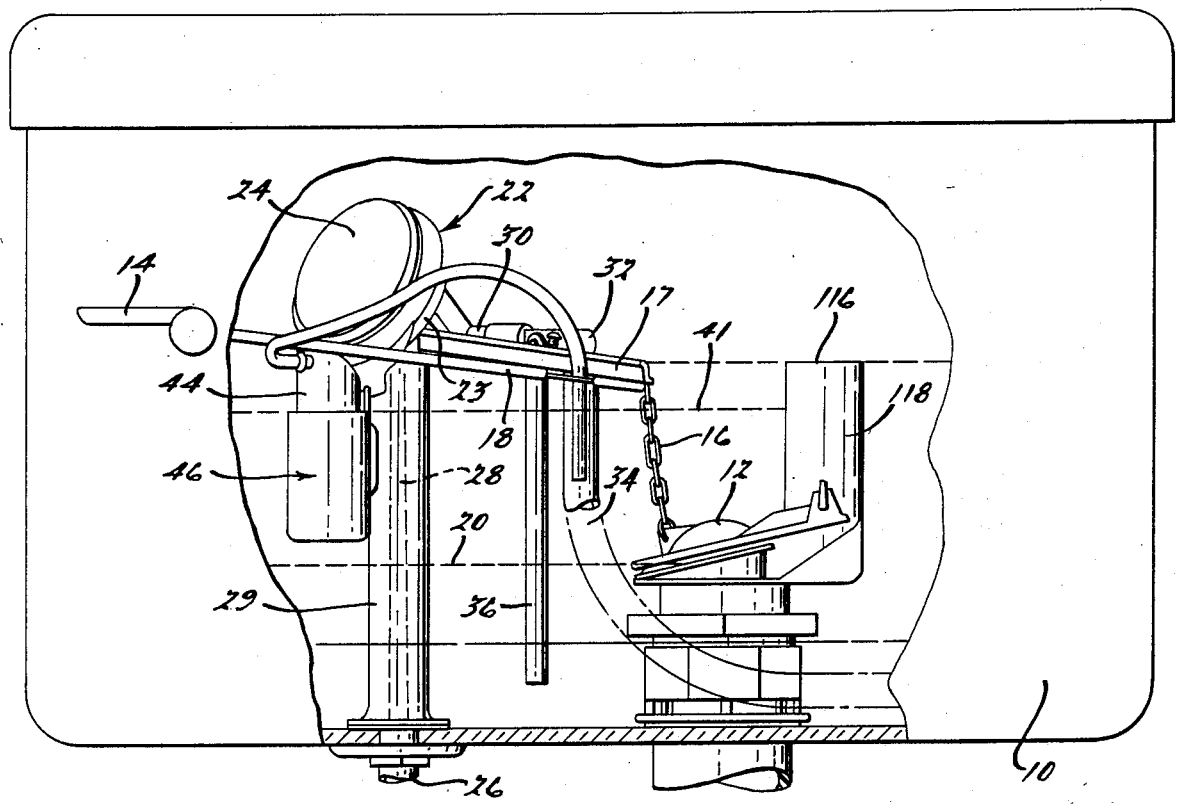
FIG. 1 is a front elevational of a tank fragmented to show the flush valve and fill valve according to one embodiment of the invention.
Figure 2:
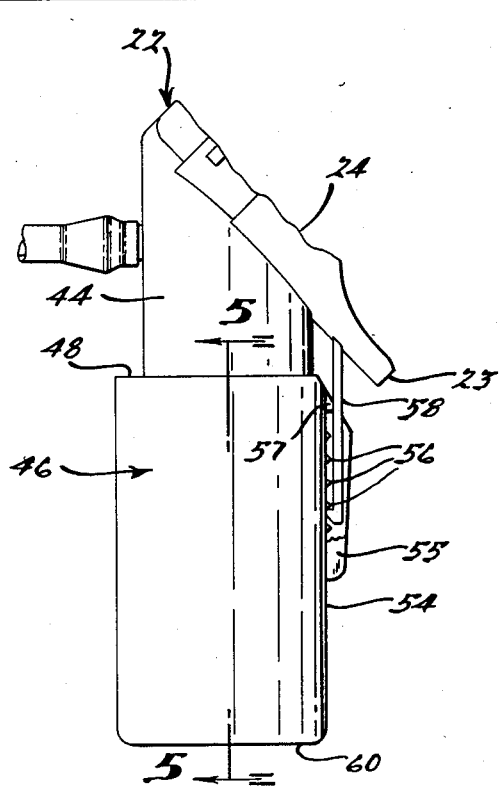
FIG. 2 is an enlarged fragmented view of the fill valve showing the cup member attached to the control chamber section of the fill valve.

As shown in FIG. 1, a toilet tank 10 has a flush valve 12 operably connected to a flush handle 14 in the standard conventional fashion via a chain 16, diverter arm 17, and lever arm 18. The flush valve 12 provides for the water level in the tank to empty to a level indicated at 20 when it is operated.

A fill valve 22 has a housing 23 with a main valve section 24 housed therein and operably connected to an inlet conduit 26 securely connected at the bottom of the tank 10 via internal water passage 28 passing through a stem section 29. The main valve section 24 is shown in my U.S. Pat. No. 4,574,826 and is incorporated herein by reference. The main valve section 24 is in communication with an outlet 30 and a diverter mechanism 32 which directs water either through conduit 34 which leads to a rim wash or fill conduit 36 which leads to the interior of the tank 10. The diverter 32 which controls the direction of the water through outlet 30 is of conventional configuration and is operated by the diverter arm 17 raised when lever 18 opens flush valve 12 to direct water to conduit 34 and lowered by chain 16 when flush valve 12 closes to direct water to fill conduit 36.

In low water consumption toilets, it is important to accurately determine the fill level as indicated by line 41. It is also important to provide adjustment of the fill level 41 to compensate for manufacturing tolerances in the water closet tank 10 and fill valve 22. The main valve section 24 is responsive to air pressure in a control chamber 42 shown in FIGS. 5 and 6 formed by a cylindrical probe section 44 having a peripheral wall 45 and tubular member 72. The probe 44 forms upper chamber section 42a and tubular member 72 forms lower chamber section 42b. Sections 42a and 42b form the chamber 42. The air pressure is determined by the level of water within the chamber 42.

The invention includes a cup element 46 mounted about the probe 44 such that water cannot enter into the chamber 42 until the water in the tank gets up to level 41 and flows into the interior 82 of cup 46. As shown in FIGS. 2–7, the cup member 46 has an open upper end 48 and outer cylindrical wall 50 with circumferentially spaced vertically extending centering ribs 52. One portion of the side wall has a flattened section 54 with a series of horizontally extending ribs 56 that are vertically spaced. Two external vertically extending shoulders 55 are positioned adjacent the ends of the ribs 56. A resilient pawl 58 depending from housing 23 fits between a pair of ribs 56 to secure the cup at a vertically desired level. The pawl 58 fits between shoulders 55 to prevent undesirable rotation of cup 46. Top shoulder 57 prevents accidental disengagement of the cup 46 downwardly from pawl 58.

Figure 4:
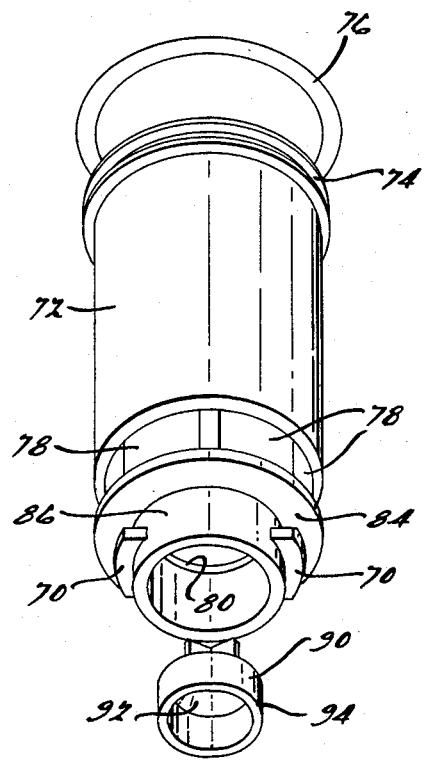
FIG. 4 is a bottom perspective and exploded view of the interior tubular member, check valve member and O-ring mounted to the cup member shown in FIG. 3.

A bottom portion 60 of the cup 46 has an aperture 62 therethrough circumscribed by an internal flange 64. A cross bar 66 extends across the aperture 62. The upper end of the flange 64 has a bayonet fitting flange 68 which can engage bayonet flanges 70 of an inner tubular member 72 as shown in FIGS. 4 and 5. The interior tubular member 72 has an upper end with an annular groove 74 which receives an O-ring 76 and is sized to sealingly and slidably engage the peripheral wall 45 of the control chamber section 44. The inner tube has openings 78 in communication with the interior 82 of the cup 46 which is in turn in open communication with the upper end 48.

The inner tubular member 72 has a flange 84 which sits on flange 64 to create a seal therebetween when the bayonets 70 engage the bayonet flange 68. Downwardly extending cylindrical section 86 extends toward bar 66 and is sized to receive a check valve element 90. The valve element 90 has a conical sealing surface 92 and a cylindrical section 94 which traps air therein. Positioning and centering blades 93 extend upwardly from conical surface 92. The valve element 90 is captured within inner cylindrical section 86 of the inner tubular member 72, is retained by the cross bar 66, and is free to vertically move to a closed position to seal aperture 80 as shown in FIG. 5 or to an open position as shown in FIG. 7.

To assemble the cup valve element properly, the check valve element is placed within the cylindrical flange section 86 of the tubular member 72 and then the tubular member 72 is positioned through the aperture and then rotated to lock the bayonet flanges 70 and 68 together to prevent removal of the tubular element 72. The assembly is then placed under the downwardly facing lower end 96 of the probe 44 and slid upward so that the seal 76 engages the inner side of peripheral wall 45 and ribs 52 engage the outer side of the peripheral wall 45.

The operation of the valve is best described starting with the fill function of the fill valve 22. When the tank and the cup member 46 are generally empty, the main valve 24 is open to allow water from the conduit 26 to pass through conduit 36 to fill the tank after flush valve 12 is closed. As the water rises to the level of check element 90, the cylindrical section 94 with the trapped air causes the check element 90 to float upward and close off aperture 80 to prevent water from entering the cup as the water rises along the exterior wall of the cup as indicated by line 100 shown in FIG. 5.

Referring to FIG. 6, when the water level in the tank gets to the top open end 48 of the cup which coincides with fill level 41, water then pours into the interior 82, through opening 78, and up through the chamber extension 42b in extension 72 beyond a level indicated by line 105 to compress the air within the chamber 42 sufficiently to shut off the main valve 24.

To understand how the cup functions, it is helpful to compare the cup invention to my U.S. Pat. No. 4,574,826 when the cup is not installed. As shown in FIG. 5, if the cup 46 and tubular member 72 were not installed, the water would fill the tank 10 until the water hits the bottom 96 of the probe section 44 to trap air within the chamber section 42a. The actuation pressure level of the water outside of the probe would be indicated by line 102 and the corresponding responsive level inside the chamber section 42a would be indicated by line 104 where the water would shut off the main valve section 24. Production fill valves have been made where the actuation pressure level of water in the tank indicated by 102 is approximately an inch and a quarter above the bottom end 96 of the probe 44.

The tubular member 72 effectively lowers the response level in chamber extension 42b to new line 105 and the actuation pressure level in tank 10 to line 103.

The cup member 46 allows the main valve to remain on when the water in the tank reaches a level substantially higher than old actuation pressure level 102 or new actuation pressure level 103. For example, water at a level as indicated in FIG. 5 by line 100 does not cause the main valve to shut off with the cup mounted in the shown position. The main valve remains open until line 41 is reached at which time the water pours into the cup interior 82 and fills chamber 42 above response level 105 to a level 107 as shown in FIG. 6. More than sufficient water pressure differential exists to compress the air in chamber 42 to a sufficient degree to actuate the main valve section 24.

Because the water level 41 at open end 48 is higher than the needed actuation level 103, the level 107 to which the water rises is slightly higher than the response level 105. This excess height provides reserved closing power so that the main valve section 24 does not cycle on and off due to evaporation or slight leakage. This reserved closing power is in addition to the reserved closing power formed by the canted diaphragm as shown in my previous patents.

When the toilet is flushed, the cup is drained to be readied for the next off actuation. As shown in FIG. 7, when the water level 112 is going downward in tank 10, the water within the cup 46 and tubular member 72 is allowed to drain through the aperture 80 as check valve 90 opens up due to the higher water pressure exerted in the interior 82 of cup member 46 than from the water within tank 10. When the water level approaches the bottom 60 of cup 46, the water within the cup interior 82 and tubular member 72 is substantially drained. The cup member then is ready for the next fill cycle in which the water can then be delayed from entering the cup member 46 until the water pours over the top end 48 of the cup at fill level 41.

The tubular member 72 by forming the chamber extension 42b allows further adjustability of the cup member 46 in a downward position so that its top end 48 can be positioned lower than the old actuation level 102 and still function to provide an accurate fill level. Because the aperture 78 is spaced below open end 48 of the cup substantially a greater distance than level 102 is from the bottom end 96, sealing ring 76 can be positioned near the bottom end 96 so that open end 48 is below old actuation level 102. The inner tubular member 72 forms the chamber extension 42b so that the response level 105 within the chamber extension drops because of the greater amount of air within the combined chamber 42 formed by upper section 42a and chamber extension 42b. Actuation level 103 corresponding to response level 105 is also lowered. The cup 46 is long enough to extend higher than new adjustable actuation level 103. Hence, the water pressure differential between cup opening 48 and the opening 78 is sufficient to close the main valve section 24 no matter at what vertical position the cup opening 48 is placed. Therefore, the cup 46 and inner tubular member 72 provide for upward and downward adjustability of fill level 41 with respect to old actuation level 102. The downward adjustability is needed to maintain the low water conservation properties in toilet tanks that have lower water settings. The higher adjustability level is needed to maintain the adequate drainage within cup member 46 when the water level in the tank at its empty position is set at higher levels than normal.

The tubular extension 72 also allows for a fill valve 22 to be installed where the empty and filled tank levels 20 and 41 are relatively close together. The tank fill and empty levels can be approximately as close as open end 48 is to opening 78 in tubular member 72. This closeness allows low profile tanks to still be used in low water consumption toilets. The height of fill level 41 can be properly set without changing the position of the main valve section 24 which has a vacuum breaker (not shown) installed therein. The vacuum breaker is often required to be positioned a predetermined distance above the top end 116 of overflow pipe 118 as shown in FIG. 1. This requirement precludes a telescopic shortening of stem section 29 to lower the main valve section 24. The cup member 46 and tubular extension 72 allow for easy adjustability to any particular water tank eliminating the necessity of adjusting the top end 116 of pipe 118 or the necessity of lowering or raising the main valve section 24. A mere sliding of the cup member 46 up or down provides for the correct adjustment within a wide variety of low water consumption tanks. The cup provides for an adequate fill level 41 and also adequate drainage therein when the water tank 10 is empty. The drainage provides for proper resetting for the next shut off actuation of the main valve section 24.

The adjustable cup 146 as shown in FIGS. 8, 9 and 10 provides for a more economical cup that can be used with toilet tanks that do not have the tight space requirements between the fill tank level and the empty tank level. The cup 146 provides easy means to adjust fill levels in tanks that have a two and a half to three inch difference between the fill level and empty level. The cup member 146 has an upper open end 148 and a bottom 160 with an aperture 180 therethrough. Longitudinal vertically extending ribs 152 are spaced about interior of the cup 146. Horizontal ribs 156 are adjacent one flattened side 154 at which two vertical shoulders 155 extend to be mounted in like fashion to the resilient pawl 58 of fill valve 22. The probe 44 has its bottom end 96 positioned within the tank 10 at the lowest point taking into consideration all manufacturing tolerances and all toilet tanks for which fill valve 22 is designed. In other words, the fill valve is vertically positioned so that the bottom 96 is set to provide the actuation pressure level 102 at the lowest possible needed level.

Cup member 146 has a check valve 190 in the form of a buoyant sphere which can seat against aperture 180 to close it. The check valve 190 is captured by resilient prong 192 depending from the bottom 160 of the cup member 146.

The cup member is slid onto the end of probe 44 such that its upper end 148 is above the lowest actuation level 102. The ribs 152 abut against the probe 44 to help center and maintain the cup 146 in a vertically upright position. The pawl 58 is set between two adjacent ribs 156 to affix the vertical height of upper end 148. Top shoulder 157 prevents accidental disengagement of the cup 146 downwardly from pawl 58.

The filling and emptying of the water tank is very similar to the first embodiment in that the water cannot enter into the cup member 146 until the water level achieves fill level 41 coinciding with upper end 148. The water then pours into the cup member chamber 42 of probe 44 to shut off the main valve section 24. The check valve 190 prevents the water from entering the cup member 146 until the water reaches the fill level 41.

In addition when the toilet tank is flushed, and the water level outside the cup is lowered, the check valve 190 allows the water to drain from the interior 182 of cup member 146 to allow it to reset for the next actuation shut off of the main valve section 24.

This second embodiment provides for an economical cup member that can be used for upward adjustment of the fill level. The cup member 146 provides for adjustability of the fill level 41 with an accurate determination of the fill level. It also provides for adjustability of the fill level without requiring adjustment in the height of the main valve section 24.

It is also foreseen that the cup member can be used for fill valves that use a float within control chamber 42 where the position of the float turns on or shuts off the main valve. Air pressure is not necessary in chamber 42 if a mechanical float is substituted.

Other variations and modifications of the present invention are possible without departing from the scope and spirit as defined in the appended claims.

I claim:

1. A fill valve for a tank characterized by:
   a housing containing a main valve means operably connectable to a liquid inlet conduit for opening and closing with respect to said inlet conduit;
   means for controlling said main valve means in response to a response level of liquid in a control chamber that corresponds to an actuation pressure level in said tank;
   said control chamber within said housing having an inlet in open communication with said tank;
   said inlet being positioned above the bottom of said control chamber and said actuation pressure level in said tank such that when the liquid level in the tank rises to the inlet above said actuation pressure level to a fill level at which time liquid overflows into said inlet and passes downward to said control chamber and fills said control chamber at least to said response level wherein the means for controlling the main valve means closes said main valve; and
   drain means for draining liquid from said control chamber to reset said means for controlling said main valve means when the liquid level drops below said fill level.

2. A fill valve as defined in claim 1 further characterized by:
   means for adjusting the vertical position of said inlet within said tank.

3. A fill valve as defined in claim 2 further characterized by:
   means for adjusting said response level of said liquid within said control chamber such that said actuation pressure level remains below said inlet when said inlet is adjusted downwardly.

4. A fill valve as defined in claim 2 further characterized by:
   an inlet member having said inlet therethrough and having a passage from said inlet in direct communication with said control chamber, said member being slidably mounted to said valve housing in a vertical direction relative to said control chamber to adjust the vertical position of said inlet.

5. A fill valve as defined in claim 4 further characterized by:
   said means for controlling said main valve being responsive to the air pressure in said control chamber that depends on the level of liquid therein;
   said inlet member having a tubular section constructed to be telescopically fitted to said fill valve housing and downwardly extending therefrom to form a control chamber extension of said control chamber wherein said response level of liquid in said control chamber can be adjusted downwardly when said inlet member is adjusted downwardly.

6. A fill valve for a tank characterized by:
   a housing containing a main valve operably connectable to a liquid inlet conduit for opening and closing with respect to said inlet conduit;
   a downward extending hollow probe defining a control chamber therein;
   means for controlling said main valve in response to a response level of liquid in said control chamber that corresponds to an actuation pressure level of liquid in said tank;
   a cup surrounding said probe having an upper open end positioned above the lower end of said probe and said actuation pressure level in said control chamber;
   a clearance between said probe and cup defining an inlet through which liquid in said tank above said upper end of said cup overflows into said clearance and enters into said control chamber and fills said control chamber at least to said response level wherein the means for controlling said main valve closes said main valve; and
   a drain means at the bottom end of said cup for draining liquid from said control chamber to reset said means for controlling said main valve when the liquid level in the tank drops below said upper end of said cup.

7. A fill valve as defined in claim 6 further characterized by:
   means for adjusting the vertical position of said cup with respect to said probe.

8. A fill valve as defined in claim 6 further characterized by:

said drain means including an aperture in the bottom of said cup that allows liquid to drain out of said cup; and a check valve operably mounted with respect to said aperture to prevent liquid from flowing through the aperture from said tank into said cup.

9. A fill valve as defined in claim 8 further characterized by:

said check valve including a float valve member and cage retaining said float member, said float member constructed to float up against and to close said aperture or to drop away and open said aperture.

10. A fill valve as defined in claim 6 further characterized by:

said cup affixed to an inner tubular member that is sealingly and slidably connected to said probe;

said tubular member extendable below said probe to provide an adjustable lower section of said control chamber.

11. A fill valve as defined in claim 6 further characterized by:

detent means on said cup to engage a complementary securement means on said fill valve housing to secure said cup in a selected adjusted position.

12. A fill valve as defined in claim 11 further characterized by:

said detent means including vertically spaced horizontal ribs on said cup; and said securement means including a resiliently biased engaging pawl on said housing engageable between any adjacent two ribs.

13. A replaceable inlet member for a fill valve for a tank, said fill valve having a housing containing a main valve means operably connectable to a liquid inlet conduit for opening and closing with respect to said inlet conduit, means for controlling said main valve means in response to a response level of liquid in a control chamber that corresponds to an actuation pressure level in said tank, said control chamber within said housing having an inlet in open communication with said tank; said inlet member characterized by:

said inlet member being constructed to be secured to said control chamber of said fluid fill valve;

an interior of said inlet member communicable with said control chamber of said fluid fill valve;

an upper open end of said inlet member being in fluid communication with said interior; and a drain means at a bottom portion of said inlet member to let liquid therein drain therefrom when liquid in said tank is at a lower level than in said interior.

14. An inlet member as defined in claim 13 further characterized by:

said inlet member having a generally cup-like configuration and is mountable about said control chamber with an upper open end sized to receive said control chamber forming an annular clearance therebetween.

15. An inlet member as defined in claim 14 further characterized by:

said generally cup-like inlet member having an aperture at its lower end;

an inner tubular member secured at its lower end to said aperture;

a check valve element interposed between said inlet member and inner tubular member to form said drain means.

16. An inlet member as defined in claim 15 further characterized by:

a seal member mounted about said inner tubular member and sized to sealingly engage a peripheral wall defining said control chamber.

17. An inlet member to be mounted to a fluid fill valve having a control chamber with a downwardly facing open end with said fill valve to be fixedly mounted in a tank, said inlet member characterized by:

an upper open inlet being positioned above said downwardly facing open end of said control chamber when said inlet member is mounted to said fluid fill valve with said control chamber;

an upwardly facing control chamber end in fluid communication with said open inlet;

seal means for telescopically mounting said control chamber end to said downwardly facing open end of said control chamber and forming a seal therebetween; and a drain means of a bottom portion of said inlet member to let liquid therein drain therefrom when liquid in said tank is lower than said upper open inlet.

* * * * *